Feb. 9, 1960 S. DUINKER 2,924,673

HYBRID SYSTEM

Filed June 21, 1956 2 Sheets-Sheet 1

INVENTOR
SIMON DUINKER

BY Fred M. Vogel
AGENT

Feb. 9, 1960 S. DUINKER 2,924,673

HYBRID SYSTEM

Filed June 21, 1956 2 Sheets-Sheet 2

INVENTOR
SIMON DUINKER

BY Fred M. Vogel
AGENT

United States Patent Office 2,924,673

Patented Feb. 9, 1960

2,924,673

HYBRID SYSTEM

Simon Duinker, Eindhoven, Netherlands, assignor, by mesne assignments, to North American Philips Company, Inc., New York, N.Y., a corporation of Delaware Application June 21, 1956, Serial No. 592,845

Claims priority, application Netherlands July 11, 1955

3 Claims. (Cl. 179—170)

This invention relates to hybrid systems such as are used, for example, for telephony purposes in stations, in which two-wire circuits are connected to four-wire circuits or in amplifiers for two-way traffic over two-wire circuits and so on. Such hybrid systems permit transmission between either of two signal circuits and a third signal circuit, but prevent transmission between the two first-mentioned signal-circuits, at least via the hybrid system. Such a system usually comprises a transformer which is as linear as possible and the primary winding of which is provided in either of the conductors of the third signal circuit or, if earth-symmetry is desired, in both of them. The secondary windings lead to either of both remaining signal circuits, and the centre-tapping of the primary winding in one conductor and a point of the other conductor or, if present, the centre-tapping of the other set of primary windings constitute the direct current junctions to the other of both remaining signal circuits, it being essential for both parts of the third signal circuit to be balanced as accurately as possible at both sides of the hybrid system.

The secondary windings of the aforesaid hybrid transformer frequently lead to the input of an amplifier which serves to transmit, after amplification, the signals from a third signal circuit.

The present invention has for its object to provide a circuit arrangement which simultaneously fulfills the function of a hybrid transformer and of an amplifier, thus dispensing with one of these elements, and has the feature that the windings in the third signal circuit constitute the input windings of an amplifier, the operation of which is based on the influence exerted by a magnetic field on the conduction properties of semi-conductors with regard to the charge-carriers.

Figure 1:
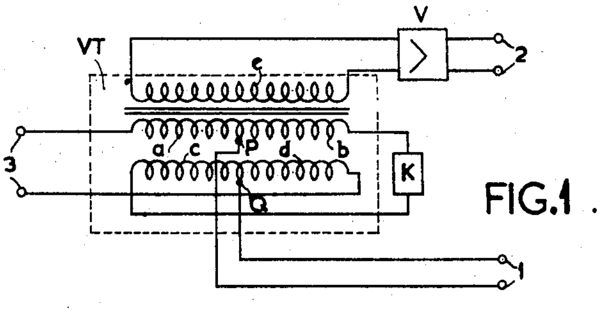
Figure 2:
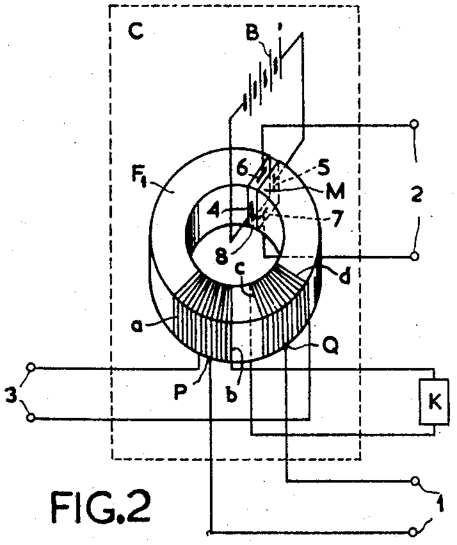
Figure 3:
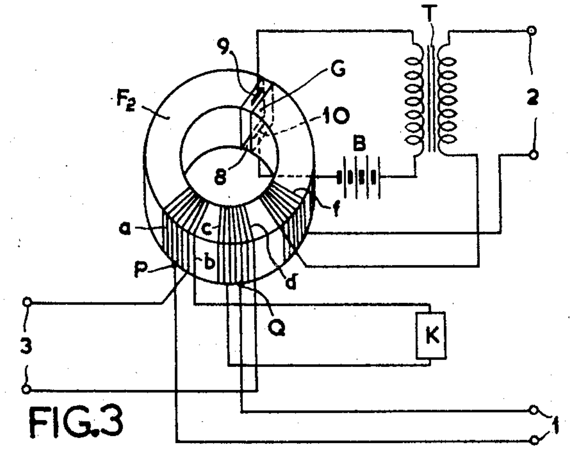
Figure 4:
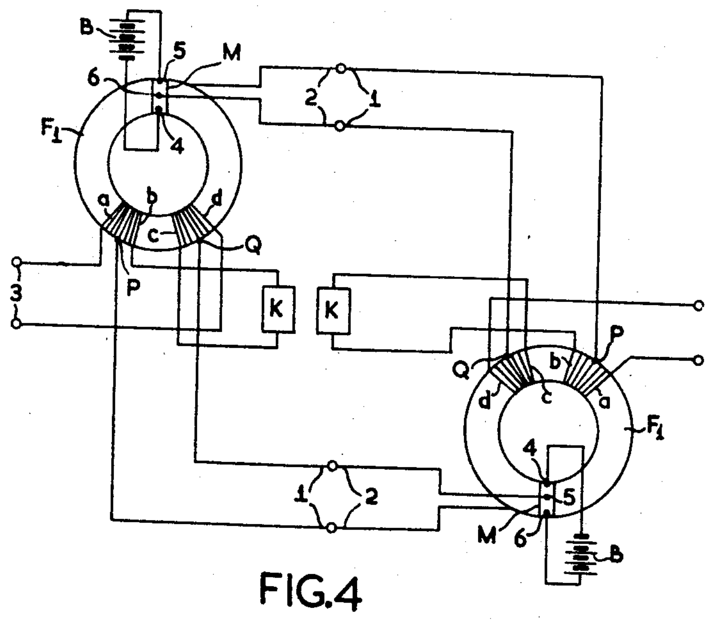
Figure 5:
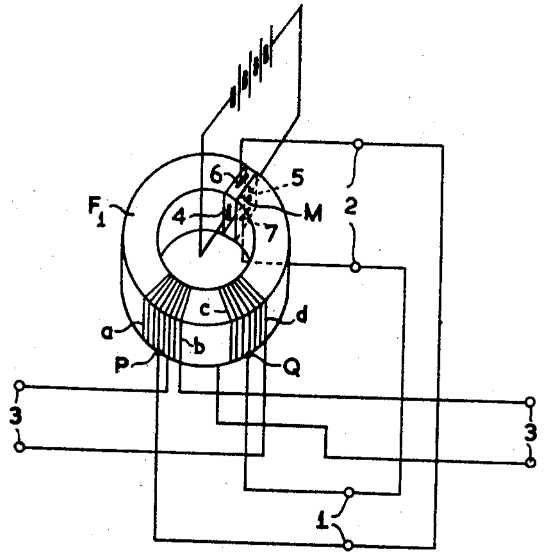

In order that the invention may be readily carried into effect, examples are given with reference to the accompanying drawings, in which Fig. 1 shows an example of a conventional hybrid system, Figures 2 and 3 show examples of two-wire and four-wire circuits according to the invention, and Figures 4 and 5 show examples of two-wire amplifiers according to the invention.

Fig. 1 shows a hybrid system such as is used for connection of a two-wire circuit to a four-wire system. The reference numerals 1, 2 and 3 denote three signal circuits permitting transmission from 1 to 3 and from 3 to 2, whereas transmission from 1 to 2 and conversely is precluded. This is achieved by using a hybrid transformer VT, the primary windings *a*—*b* and *c*—*d* of which are wound on a core L such that the respective fluxes produced by the signal currents of circuit 3 support each other, *a*, *b*, *c* and *d* being possibly equal windings, while by means of the linebalance K both halves of the signal circuit 3 are balanced as well as possible with regard to points P and Q. In order to secure undistorted transmission from 3 to 2 the polarisation characteristic of core L should be as linear as possible, at least that part of the characteristic in which the core is driven. An amplifier V is coupled to the secondary windings *e* of the hybrid transformer VT.

Fig. 2 shows diagrammatically an example of a circuit arrangement fulfilling the same function as the circuit arrangement shown in Fig. 1, but in which the hybrid transformer VT and the amplifier V are replaced by the combination C, in which M represents a plate-shaped member of a material having the so-called Hall-effect.

The Hall-effect consists in utilising the phenomenon that upon the passage of free charge-carriers, electrons or holes through a body which is moreover acted upon by a magnetic field, at least one component of which is operative in a direction at right angles to the flow-direction of said charge-carriers, an electric fieldstrength is produced at right angles to the plane through the flow-direction of the charge-carriers and the direction of the magnetic field. This electric fieldstrength represents an electromotive force which is termed "Hall-voltage."

Said electric fieldstrength E depends in the following manner upon the current density $j$ of the charge-carriers, the magnetic fieldstrength H and the angle $\alpha$ between the flowdirection of the charge carriers and the direction of the magnetic field:

$$E=R.j.H. \sin \alpha$$

where R is a proposition constant termed Hall-coefficient.

Although any material containing free charge-carriers will exhibit the Hall-effect, not every material enters into account for use in a device according to the invention, since the coefficient R determining the intensity of the effect should exceed a given value in order to yield the required minimum electric voltage which may reasonably serve for amplification purposes.

It is known that materials having suitable properties in this respect are germanium and silicon.

The member M comprises metallic coatings 4 and 5 which are connected to a direct voltage supply B. From the coatings 6 and 7 the so-called Hall-voltage may be taken, which is produced by the action of a magnetic field, preferably at right angles to the plate-shaped member.

Since, in the circuit arrangement as represented, $j$ is constant, the Hall-voltage is proportional to the magnetic field.

This magnetic field is produced by currents flowing in the coils *a*—*b* and *c*—*d* inserted in the signal-circuit 3. For this purpose these coils may, for example, be wound on an annular ferromagnetic core $F_1$ comprising an air-gap 8 in which the plate-shaped member M is arranged.

The coils *a*—*b* and their tap P, and the coils *c*—*d* and their tap Q, are the same as the corresponding coils in the conventional circuit of Fig. 1, and, as in the conventional hybrid circuit, the line 3 is connected across the series combination of coils *a*—*b*, the line-balance impedance K, and coils *c*—*d*, and the line 1 is connected to the taps P and Q. The coil *e* and amplifier V of Fig. 1, have been replaced by the member M, and the coils *a*—*b* and *c*—*d*, and the voltage source B, are relatively polarized so that signals pass between lines 1 and 3, and between lines 3 and 2, but not between lines 1 and 2, thus achieving a hybrid operation. The signals pass between lines 1 and 3 because these lines are connected together via the coils *a*—*b* and *c*—*d*. The signals pass between lines 2 and 3 because the line 3 is coupled to the core $F_1$ via the windings *a—b* and *c—d*, and the line 2 is coupled to the core $F_1$ via the member M. Signals do not pass between lines 1 and 2, because the line 1 is not coupled to the core $F_1$, due to its signal-cancelling balanced connection to the taps P and Q on coils *a—b* and *c—d*.

Fig. 3 shows an example of the invention, in which, the magneto-resistance effect is utilised. In Figures 2 and 3, corresponding parts are provided with the same references.

In Fig. 3, G represents a plate-shaped member of a material exhibiting the so-called magneto-resistance effect, which is to be understood to mean the phenomenon that the resistance of given materials such as, for example, bismuth, germanium and indium-antimony, depends to a comparatively high degree upon magnetic fields acting transversally or longitudinally upon the charge-carriers in these materials. Hence, the value of the resistance of such materials is controlled by the magnetic fields acting upon the charge-carriers. It is to be noted that the resistance variations depend only upon the value of the magnetic field (in a given direction), but not upon the polarity of this field. Hence, the relationship between the resistance and the magnetic field is quadratic so that, as is known, in amplifiers based on this effect the controlling magnetic field has to be superposed on a constant pre-magnetization field.

In order to make this constant pre-magnetization field operative in the member G, the ferromagnetic core $F_2$, in an air-gap of which the member G is arranged, may for example comprise additional windings through which a constant current passes, or may at least partly consist of permanent magnetic material. In the example shown in Fig. 3 the latter is assumed to be the case.

The member G comprises metallic coatings 9 and 10 connected to a direct voltage supply B and, for example, the primary winding of an output transformer T. The secondary winding of this transformer constitutes the input of the signal-circuit 2. Resistance variation of the member G due to the influence of the magnetic fields produced by the signal currents passing through the coils *a—b* and *c—d* of circuit 3 sets up voltages across the transformer T, which voltages are proportional to these currents.

The coils *a—b* and their tap P, and the coils *c—d* and their tap Q, are the same as the corresponding coils in the conventional circuit of Fig. 1, and, as in the conventional hybrid circuit, the line 3 is connected across the series combination of coils *a—b*, the line-balance impedance K, and coils *c—d*, and the line 1 is connected to the taps P and Q. The coil *e* and amplifier V of Fig. 1, have been replaced by the member G, and the coils *a—b* and *c—d*, and the voltage source B, are relatively polarized so that signals pass between lines 1 and 3, and between lines 3 and 2, but not between lines 1 and 2, thus achieving a hybrid operation. The signals pass between lines 1 and 3 because these lines are connected together via the coils *a—b* and *c—d*. The signals pass between lines 2 and 3 because the line 3 is coupled to the core $F_2$ via the windings *a—b* and *c—d*, and the line 2 is coupled to the core $F_2$ via the member G. Signals do not pass between lines 1 and 2, because the line 1 is not coupled to the core $F_2$, due to its signal-cancelling balanced connection to the taps P and Q on coils *a—b* and *c—d*.

In accordance with the desired effects current or voltage feedback may be employed. In Fig. 3, for example, the arrangement comprises a current feedback circuit from the output of the transformer T to the primary side of the hybrid transformer. In accordance with the winding sense of the winding *f*, with respect to the sense of windings *a—b* and *c—d*, positive feedback or negative feedback occurs.

Fig. 4 shows a circuit arrangement according to the invention, for use in amplifiers in two-wire circuits for two-way traffic. In this instance, the amplifiers are of the type as shown in Fig. 2. Otherwise, this figure is self-explanatory. Lines 1 and 2 of the first amplifier are connected to lines 2 and 1, respectively, of the second amplifier. In each amplifier, the coils *a—b* and their tap P, and the coils *c—d* and their tap Q, are the same as the corresponding coils in the conventional circuit of Fig. 1, and, as in the conventional hybrid circuit, the line 3 is connected across the series combination of coils *a—b*, the line-balance impedance K, and coils *c—d*, and the line 1 is connected to the taps P and Q. The coil *e* and amplifier V of Fig. 1, have been replaced by the member M, and the coils *a—b* and *c—d*, and the voltage source B, are relatively polarized so that signals pass between lines 1 and 3, and between lines 3 and 2, but not between lines 1 and 2, thus achieving a hybrid operation. The signals pass between lines 1 and 3 because these lines are connected together via the coils *a—b* and *c—d*. The signals pass between lines 2 and 3 because the line 3 is coupled to the core $F_1$ via the windings *a—b* and *c—d*, and the line 2 is coupled to the core $F_1$ via the member M. Signals do not pass between lines 1 and 2, because the line 1 is not coupled to the core $F_1$, due to its signal-cancelling balanced connection to the taps P and Q on coils *a—b* and *c—d*.

Fig. 5 shows a circuit arrangement of this type but now comprising only one amplifier for both directions. In this case, both cable halves should be adequately balanced at both sides of points P and Q. The coils *a—b* and their tap P, and the coils *c—d* and their tap Q, are the same as the corresponding coils in the conventional circuit of Fig. 1, and the two lines 3 are respectively connected to the different ends of each of the windings *a—b* and *c—d*. In this respect, the element K of Fig. 1 is replaced by the outgoing line 3. Line 1 is connected to the taps P and Q. The coil *e* and amplifier V of Fig. 1, have been replaced by the member M, of which the coatings 6 and 7 are connected to line 2 which, in turn, is connected to line 1. As described before, the signals pass between line 1 and incoming line 3, because these lines are connected together via the coils *a—b* and *c—d*. The signals pass between line 2 and incoming line 3, because both of these lines are coupled to the core $F_1$. Signals do not pass via the core $F_1$ between lines 1 and 2, because line 1 is not coupled to the core, due to its balanced connection to coils *a—b* and *c—d*. The signals which are amplified by the member M, are fed via line 2 to line 1, with the result that the signals are amplified in both directions between the incoming line 3 and the outgoing line 3.

If a station or exchange comprises a plurality of such combinations of a hybrid system and an amplifier, the supply, in Figures 2 and 3 from the source B, may occur from a common source as well as any direct current pre-magnetization.

Finally, it is pointed out that, in connection with the amplification of the amplifiers based on said effects and also in conjunction with a decrease in thermal noise, it is advantageous to arrange said combinations in spaces in which the temperature is as low as possible.

What is claimed is:

1. A hybrid signal system for transmission between either of two lines and a third line, but preventing transmission between said two lines, comprising a core of magnetic material, a pair of windings positioned on said core, means connecting said third line in series with at least one of said windings to provide a net magnetic flux in said core due to signal currents in said third line, means connecting a first one of said two lines to said windings so that flux produced in said core by signal currents in said first line are cancelled and at least a portion of said last mentioned signal currents flow in said third line, whereby said windings and said connections thereto form a hybrid circuit, an amplifier member of semi-conductor material interposed in the magnetic signal path of said core, and means connecting the second one of said two lines to said amplifier member to receive signals therefrom.

2. A system as claimed in claim 1, including a feedback winding on said core and interposed electrically in series with said second line.

3. A system as claimed in claim 1, in which said amplifier member is made of a material exhibiting a magneto-resistance effect, and in which said core comprises a permanently magnetized material for applying a premagnetization field to said member.

References Cited in the file of this patent

UNITED STATES PATENTS

| | | |
|---|---|---|
| 2,553,490 | Wallace | May 15, 1951 |
| 2,649,574 | Mason | Aug. 18, 1953 |
| 2,743,322 | Pierce et al. | Apr. 24, 1956 |

OTHER REFERENCES

Manual No. 2266–L–1A, The Signal Corps School, United States Army, Fort Monmouth, N. J., published May 20, 1934. (Pages 5 and 6 relied on.)